United States Patent [19]

Choi

[11] Patent Number: 5,502,506
[45] Date of Patent: Mar. 26, 1996

[54] APPARATUS FOR EQUALIZING TELEVISION SIGNALS WITH FAST CONVERGENCE

[75] Inventor: Young-Bae Choi, Seoul, Rep. of Korea

[73] Assignee: Daewoo Electronics Co., Ltd., Seoul, Rep. of Korea

[21] Appl. No.: 334,295

[22] Filed: Nov. 4, 1994

[30] Foreign Application Priority Data

Nov. 4, 1993 [KR] Rep. of Korea ................. 93-23325

[51] Int. Cl.$^6$ ................................................. H04N 5/21
[52] U.S. Cl. ........................ 348/607; 348/735; 375/233; 364/724.2
[58] Field of Search ............................. 348/611, 607, 348/614, 735, 726; 375/233, 232, 229, 350; 364/724.19, 724.20; 333/18, 28 A; H04N 5/21

[56] References Cited

U.S. PATENT DOCUMENTS 5,245,437  9/1993  Na .................................. 348/735
5,293,234  3/1994  Ko .................................. 348/614
5,321,512  6/1994  Huang ............................. 348/614

FOREIGN PATENT DOCUMENTS 0197971  12/1982  Japan ............................. 358/167

Primary Examiner—Victor R. Kostak
Assistant Examiner—Jeffrey S. Murrell
Attorney, Agent, or Firm—Anderson Kill Olick & Oshinsky

[57] ABSTRACT

An improved television signal equalization apparatus includes a first coefficient update module for receiving the equalized television signal and for generating a first updated equalizer coefficients including first coarsely updated coefficients and finely updated coefficients; and a second coefficient update module, at a channel change operation, for generating second updated coefficients having a coarsely updated coefficients corresponding to a changed channel.

1 Claim, 1 Drawing Sheet

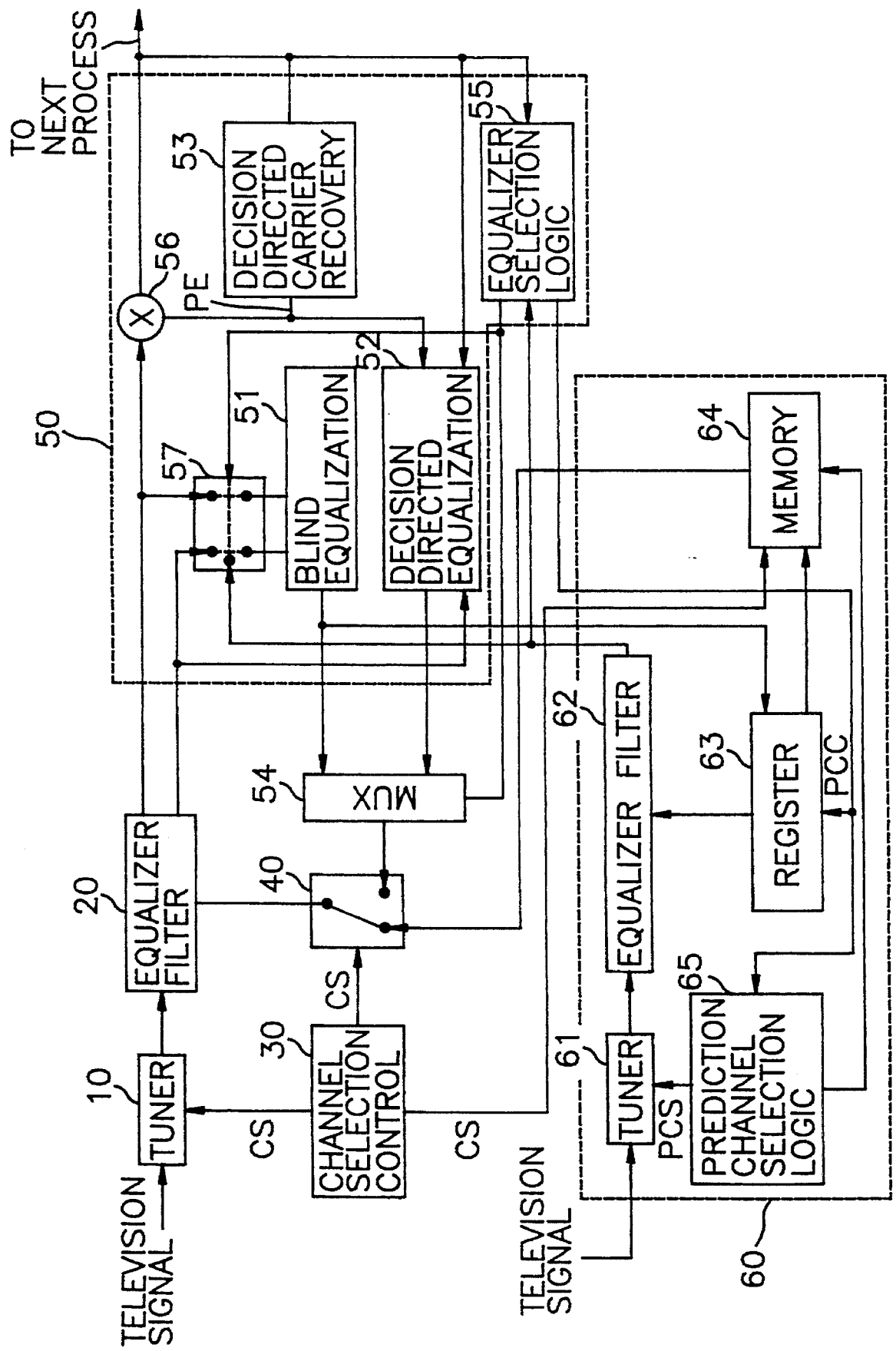

APPARATUS FOR EQUALIZING TELEVISION SIGNALS WITH FAST CONVERGENCE

FIELD OF THE INVENTION

The invention relates to an equalization apparatus for use in a high definition television signal receiving system; and, more particularly, to an improved equalization apparatus for providing a more rapid convergence of equalizer coefficients at channel change operation.

DESCRIPTION OF THE PRIOR ART

In a conventional high definition (HD) television system, television signals from a plurality of HD television signal transmission systems are transmitted over corresponding communication channels such a radio channels. An inherent problem with transmission of a television signal over a selected communication channel is that channel distortion and additive noise tend to interfere with prefer reception of the data symbols contained in the transmitted television signal, thereby degrading the ability of a HD television signal receiving system to distinguish between received symbol levels. Accordingly, a conventional HD television signal receiving system includes a channel adaptive equalization apparatus which serves to reduce the distortion encountered in the selected channel so that correct decision can be made as to which data symbols has been transmitted.

The conventional channel adaptive equalization apparatus employs filtering techniques which can counter the distortion and additive noise effects to provide good symbol decision capability. For example, one type of conventional equalization apparatus for use in a HD television signal receiving system is disclosed in an article by Samir N. Hulyalkar et al., "Advanced Digital HDTV Transmission System for Terrestrial Video Simulcasting", *IEEE Journal on Selected Area in Communications*, 11, No. 1, pp 119–125 (January, 1993), which includes a finite impulse response (FIR) filter followed by two equalizers: a blind equalizer and a nonlinear decision directed equalizer. The FIR filter includes a plurality of equalizer coefficients called tap coefficients which are adaptively adjusted up to their optimum values by using the blind equalizer and the nonlinear decision directed equalizer to reduce channel distortion. Specifically, for a selected channel, the blind equalizer is used to provide an initial convergence of the equalizer coefficients. The nonlinear decision directed equalizer is then used in order to achieve an optimum convergence of the equalizer.

However, in the prior art equalization apparatus described above, since such filter coefficients, for respective channels, are adjusted by using both of the blind and decision directed equalizers, it may be difficult to provide a fast convergence of the equalizer coefficients especially when the channel change operation is performed.

SUMMARY OF THE INVENTION

It is, therefore, a primary object of this invention to provide an improved television signal equalization apparatus which is capable of providing significantly fast convergence of the equalizer coefficients to their optimum values at channel change operation with a negligible increase in hardware complexity.

In accordance with the invention, there is provided an equalization apparatus for use in a television signal receiving system having a tuner for receiving a television signal from a selected channel, which comprises:

first equalizer filter means for receiving the television signal from the tuner and for equalizing the television signal by using a plurality of equalizer coefficients in order to generate a equalized television signal; first coefficient update means for receiving the equalized television signal and for generating first updated equalizer coefficients, including:

a blind equalization means responsive to the equalized television signal for generating first coarsely updated coefficients and responsive to a equalized prediction television signal for generating second coarsely updated coefficients;

a decision directed equalization means responsive to the equalized television signal for generating finely updated coefficients; and first control means responsive to the equalized television signal for evaluating a mean square error thereof and, when the means square error is identical to or smaller than a predetermined error value, for generating the finely updated coefficients as first updated coefficient;

second coefficient update means for generating second updated coefficients, including:

prediction channel selection means responsive to a first control signal for generating a prediction television signal from a selected prediction channel;

second equalizer filter means for receiving the prediction television signal and for equalizing the prediction television signal by using a plurality of equalizer coefficients in order to generate a equalized prediction television signal wherein the plurality of equalized coefficients are replaced by the second coarsely updated coefficients;

second control means responsive to the equalized prediction television signal for evaluating a mean square error thereof and, when the mean square error is identical to or smaller than a predetermined error value, for generating the first control signal; and means responsive to the first control signal for storing the second coarsely updated coefficients corresponding to the selected prediction channel and, a channel change operation of the television signal receiving system, for producing the second coarsely updated coefficients corresponding to a changed channel as the second updated coefficients; and coupling means for providing the first updated coefficients to the first equalizer filter means and, at the channel change operation, for coupling the second updated coefficients to the first equalizer filter means.

BRIEF DESCRIPTION OF THE DRAWINGS

The above and other objects and features of the present invention will become apparent from the following description of preferred embodiments given in conjunction with the accompanying drawings, in which:

FIGURE is a schematic block diagram of a television signal equalization apparatus in accordance with the present invention.

DETAILED DESCRIPTION OF THE PREFERRED EMBODIMENTS

Referring to the Figure, there is shown a television signal equalization apparatus in accordance with the present invention. The television signal equalization apparatus includes a first tuner 10, a first equalizer filter 20 having a plurality of equalizer coefficients, a first coefficient update module 50 for generating first updated coefficients, and a second coefficient update module 60 for generating second updated coefficients. The television signal equalization apparatus also includes a channel selection control module 30 for generating a channel selection signal CS, and a switch 40 responsive to the channel selection signal CS for selectively coupling the first and the second updated coefficients.

The first tuner 10, as well known in the art, serves, in response to the channel selection signal CS, to receive a television signal from a selected channel, wherein the channel selection signal CS is generated from a channel selection control module 30 by user's selection. The received television signal is then coupled to the first equalizer filter 20.

The first equalizer filter 20 is composed of a finite impulse response (FIR) filter and the television signal from the selected channel is filtered and equalized by the plurality of equalizer coefficients contained therein. An equalized television signal is then coupled to the first coefficient update module 50 and via a derotator 56 to a next processor, e.g., a source decoder (not shown).

The first coefficient update module 50, as described in the particle by Samir N. Hulyalkar et al., is operated in two mode, i.e., a blind mode and a decision directed mode; and includes a blind equalization block 51, a decision directed equalization block 52 and a decision directed carrier recovery block 53. In the blind mode, the blind equalization block 51, employing a known constant modulus algorithm (CMA), serves to receives via a switch 57 the television signal from the equalizer filter 20 and to generate first coarsely updated coefficients for providing an initial convergence which are coupled via a multiplexer 54 and the switch 40 to the first equalizer filter 20. The first coarsely updated coefficients for providing the initial convergence supersede the previous equalizer coefficients maintained within the first equalizer filter 20. This process is repeatedly performed until the initial convergence is achieved.

On the other hand, in decision directed mode, the decision directed equalization block 52, employing a least mean square (LMS) algorithm, serves to receives the television signal from the derotator 56 and a phase error PE; and to generate finely updated coefficients in order to achieve an optimum convergence of the equalizer coefficients. The decision-directed carrier recovery block 53 is also operated in the decision directed mode and to generate the phase error PE which is coupled to the decision directed equalization block 52 and the derotator 56 in order to track and minimize the frequency and the phase offset between the transmitted television signal and the corresponding received television signal. The finely updated coefficients for providing the optimum convergence are coupled via the multiplexer 54 and the switch 40 to the first equalizer filter 20 supersede previous equalizer coefficients maintained within the first equalizer filter 20. This process is repeatedly performed until the channel change operation is performed.

The mode change operation is controlled by using a equalizer selection logic circuit 55 for generating two mode selection signals: a blind mode selection signal and a decision directed mode selection signal. That is, the equalizer selection logic circuit 55 receives the equalized television signal from the derotator 56 in order to evaluate a mean square error (MSE) thereof. The MSE is compared with a predetermined error value which can be experimentally determined on the basis of so-termed eye pattern. When the MSE is greater than the predetermined error value, the equalizer selection logic circuit 55 generates a blind mode selection signal which serves to actuate the multiplexer 54 in order to couple the first coarsely updated coefficients outputted from the blind equalization block 51 as the first updated coefficients via the multiplexer 54 to the switch 40.

While, when the MSE is identical to or smaller than the predetermined error value, the equalizer selection logic block 55 produces a decision directed mode selection signal which serves to operate the multiplexer 54 to couple the finely updated coefficients outputted from the decision directed equalization block 51 as the first updated coefficients to the switch 40. During the first tuner 10 receives the television signal of the selected channel, the first updated coefficients are coupled via the switch 40 to the first equalizer filter 20.

As shown, the second coefficient update module 60 includes a second tuner 61, a second equalizer filter 62, a register 63, memory 64 and a prediction channel selection logic block 65. An output from the second equalizer filter 62, which is composed of the FIR filter, is coupled to the switch 57 contained in the first coefficient update module 50 and the equalizer selection logic 55.

When the first coefficient update module 50 is operated in the decision directed mode, the prediction channel selection logic block 65 serves to generate a prediction channel selection signal by using a known least recently used (LRU) algorithm. The second tuner 61 is responsive to the prediction channel selection signal and generates a prediction television signal from a selected prediction channel which is coupled to the second equalizer filter 62.

The equalized prediction television signal from the second equalizer filter 62 is coupled through the switch 57 to the blind equalization 51 which produces a second coarsely updated coefficients for the selected prediction channel. The second coarsely updated coefficients are coupled via the register 63 to the second equalizer filter 62 and supersedes previous equalizer coefficients maintained with the second equalizer filter 62. The equalizer selection logic circuit 55 monitors the output from the second equalizer filter 62 and, when the MSE of the equalized prediction television signal from the second equalizer filter 62 is smaller than the predetermined error value, generate a prediction channel change signal PCC which is coupled to the register 63 and the prediction channel selection logic block 65. The register 63 is responsive to the prediction channel change signal PCC and couples the second coarsely updated coefficients to the memory 64 for storing the second coarsely updated coefficients corresponding to the selected prediction channel. The prediction channel selection logic block 65 is then responsive to the prediction channel change signal PCC and generate another prediction channel selection signal PCS which is coupled to the tuner 61 in which receives a next prediction television signal from a next prediction channel. For the next prediction television signal, the above process is repeated and second coarsely updated coefficients corresponding to the next prediction channel are stored in the memory 64. Therefore, when the first coefficient update module 50 is operated in the decision directed mode, a plurality of prediction channels are selected and respective second coarsely updated coefficients corresponding to respective prediction channels are stored in the memory 64.

When the channel is changed by the user, the channel selection control module 30 generate the channel selection signal CS which is coupled to the first tuner 10, the memory 64 and the switch 40. Therefore, prestored second coarsely updated coefficients corresponding to the changed channel are initially read out from the memory 64 and coupled via the switch 40 as the second updated coefficients to the first equalizer filter 20.

As may be seen from above, at channel change operation, the equalizer coefficients maintained in the first equalizer filter 20 are initially replaced by an adjusted coefficients, i.e., the second coarsely updated coefficients from the second coefficient update module 50. Therefore, the present invention provides significantly fast convergence of the equalizer coefficients to their optimum values.

While the present invention has been described with respect to certain preferred embodiments only, other modifications and variations may be made without departing from the spirit and scope of the present invention as set forth in the following claims.

What is claimed is:

1. An equalization apparatus for use in a television signal receiving system having a tuner for receiving a television signal from a selected channel, which comprises:

first equalizer filter means for receiving the television signal from the tuner and for equalizing the television signal by using a plurality of equalizer coefficients in order to generate a equalized television signal;

first coefficient update means for receiving the equalized television signal and fir generating first updated coefficients, including:

a blind equalization means responsive to the equalized television signal for generating first coarsely updated coefficients and responsive to a equalized prediction television signal for generating second coarsely updated coefficients;

a decision directed equalization means responsive to the equalized television signal for generating finely updated coefficients; and first control means responsive to the equalized television signal for evaluating a mean square error thereof and, when the mean square error is identical to or smaller than a predetermined error value, for generating the finely updated coefficients as the first updated coefficients;

second coefficient update means for generating second updated coefficients, including:

prediction channel selection means responsive to a first control signal for generating a prediction television signal of a selected prediction channel;

second equalizer filter means for receiving the prediction television signal and for equalizing the prediction television signal by using the plurality of equalizer coefficients in order to generate a equalized prediction television signal wherein the plurality of equalizer coefficients are replaced by the second coarsely updated coefficients;

second control means responsive to the equalized prediction television signal for evaluating a mean square error thereof and, when the mean square error is identical to or smaller than a predetermined error value, for generating the first control signal; and means responsive to the first control signal for storing the second coarsely updated coefficients corresponding to the selected prediction channel and, a channel change operation of the television signal receiving system, for producing the second coarsely updated coefficients corresponding to a changed channel as the second updated coefficients; and coupling means for providing the first updated coefficients to the first equalizer filter means and, at the channel change operation, for coupling the second updated coefficients to the first equalizer filter means.

* * * * *